(12) United States Patent
Romeu (10) Patent No.: US 9,390,631 B2
(45) Date of Patent: Jul. 12, 2016

(54) SHAVING RAZOR DEMONSTRATION METHOD

(71) Applicant: The Gillette Company, Boston, MA (US)

(72) Inventor: Amanda Marie Romeu, Boston, MA (US)

(73) Assignee: The Gillette Company, Boston, MA (US)

( * ) Notice: Subject to any disclaimer, the term of this patent is extended or adjusted under 35 U.S.C. 154(b) by 218 days.

(21) Appl. No.: 14/457,470

(22) Filed: Aug. 12, 2014

(65) Prior Publication Data

US 2015/0099258 A1     Apr. 9, 2015

Related U.S. Application Data

(60) Provisional application No. 61/888,248, filed on Oct. 8, 2013.

(51) Int. Cl.
*G09B 19/00* (2006.01)
*B26B 21/40* (2006.01)
*B26B 21/44* (2006.01)

(52) U.S. Cl.
CPC ........ *G09B 19/0076* (2013.01); *B26B 21/4093* (2013.01); *B26B 21/446* (2013.01)

(58) Field of Classification Search
CPC ........... G09B 19/0076; B26B 21/4093; B26B 21/4081; B26B 21/443
USPC ................................................. 434/367, 365
See application file for complete search history.

(56) References Cited

U.S. PATENT DOCUMENTS

| 2,175,638 | A | 10/1939 | Rau |
| 2,897,604 | A | 8/1959 | Scott |
| 7,740,483 | B2 | 6/2010 | Taylor et al. |
| 7,854,613 | B2 | 12/2010 | Boykin et al. |
| 8,397,554 | B2 | 3/2013 | Wargo et al. |
| 2011/0247962 | A1 | 10/2011 | Chio et al. |
| 2012/0255185 | A1 | 10/2012 | Patel et al. |

(Continued)

FOREIGN PATENT DOCUMENTS

EP       2570796 A1 *   3/2013

OTHER PUBLICATIONS

Anonymous, "Don't lose your grip in wet weather", Feb. 2011. Retrieved Apr. 28, 2016 from <url:http://www.consumerreports.org/cro/magazine-archive/2011/february/cars/wet-driving/overview/index.htm>.*

(Continued)

*Primary Examiner* — Robert J Utama
*Assistant Examiner* — Peter J Alley
(74) *Attorney, Agent, or Firm* — John M. Lipchitz; Kevin C. Johnson; Steven W. Miller (57) ABSTRACT

A shaving demonstration method having a step of providing a first shaving razor with a shaving surface having at least one blade with a cutting edge. A transparent first surface is provided. The shaving surface the first shaving razor contacts the transparent first surface. Another step includes illustrating the shaving surface of the first shaving razor against the transparent first surface through a transparent second surface opposite the first surface. The first shaving razor is moved along the transparent first surface.

20 Claims, 8 Drawing Sheets

(56) References Cited

U.S. PATENT DOCUMENTS

2013/0067986 A1 3/2013 Girdler et al.
2014/0352154 A1* 12/2014 Ortins .................... B26B 21/14
                                                            30/50

OTHER PUBLICATIONS

PCT International Search Report with Written Opinion in corresponding international application PCT/US2014/058781 dated Jan. 15, 2015.

* cited by examiner

SHAVING RAZOR DEMONSTRATION METHOD

FIELD OF THE INVENTION

The present invention relates to demonstration apparatuses and methods for illustrating different benefits of razors in general, and more particularly, to apparatuses and methods for illustrating lubrication and/or moisturization performance and/or other performance differences of shaving razors.

BACKGROUND OF THE INVENTION

Consumers of disposable and system shaving razors (i.e., razor handles having a replaceable razor cartridge) continue to demand improved product performance. As a result, razor manufacturers continually try to improve upon various shaving razor performance attributes that are desired by consumers. However, even when a better shaving razor is designed and manufactured, razor manufacturing companies, advertisers and retailers face difficulty in communicating to the consumers, especially in a meaningful, clear and visual manner, that a particular shaving razor product demonstrates improved or more effective performance, for example closeness, fewer missed hairs or comfort, increased glide (i.e., lubrication), moisturization, or other benefits compared to other shaving razor products.

Accordingly, there is a need for an apparatus and/or a method for demonstrating to consumers particular advantages of using certain shaving razors. There is also a need for a method to demonstrate performance differences between shaving razors (such as increased lubrication or moisturization and/or components that release lubrication and/or moisturization in front of the blades) and to clearly communicate these differences to consumers.

SUMMARY OF THE INVENTION

In one aspect, the invention features, in general, a simple, efficient shaving demonstration method for communicating to a consumer particular advantages of using a certain shaving razor. The shaving demonstration method may include providing a first shaving razor having a shaving surface with at least one blade having a cutting edge. A transparent first surface may be provided and may be contacted by the shaving surface of the first shaving razor. The shaving demonstration method may include a step of illustrating the shaving surface of the first shaving razor against the transparent first surface through a transparent second surface opposite the first surface. In addition, a step of moving the razor along the transparent first surface may be included to illustrate a consumer benefit.

If, desired, particular embodiments may optionally include releasing a first substance from a first component of the first shaving razor in front of the at least one blade and onto the transparent first surface. The shaving demonstration method may optionally include the first substance covering the at least one blade. Particular embodiments may also optionally include releasing a second substance from a second component of the first shaving razor behind the at least one blade onto the transparent second surface. The first and/or second substances may be a liquid or an image of a liquid. At least one of the first and second surfaces may be tinted and/or a grid. Particular embodiments may also optionally include at least one of the first and second surfaces are glass or plastic.

In another aspect, the invention features, in general, a simple, efficient shaving demonstration method for commu- nicating to a consumer particular advantages of using a certain shaving razor compared to a different razor. The shaving demonstration method may include providing a first shaving razor having a shaving surface with at least one blade and also providing a second shaving razor having a shaving surface with at least one blade. A transparent first surface may be provided for a step of contacting the transparent first surface with the shaving surface of the first shaving razor and the shaving surface of the second shaving razor. The shaving surface of the first shaving razor and the shaving surface of the second shaving razor against the first surface may be illustrated through a transparent second surface opposite the first surface. The first shaving razor and the second shaving razor may move along the transparent first surface.

If, desired, particular embodiments may optionally include a first component of the first shaving razor releasing a first substance in front of the at least one blade of the first shaving razor and onto the transparent first surface. Particular embodiments may also optionally include a second component of the first shaving razor releasing a second substance onto the transparent first surface. In certain embodiments, the shaving demonstration method may illustrate the first substance covering the at least one blade.

The details of one or more embodiments of the invention are set forth in the accompanying drawings and the description below. It is understood that certain embodiments may combine elements or components of the invention, which are disclosed in general, but not expressly exemplified or claimed in combination, unless otherwise stated herein. Other features and advantages of the invention will be apparent from the description and drawings, and from the claims.

DETAILED DESCRIPTION OF THE DRAWINGS

DETAILED DESCRIPTION OF THE INVENTION

Figure 1A:
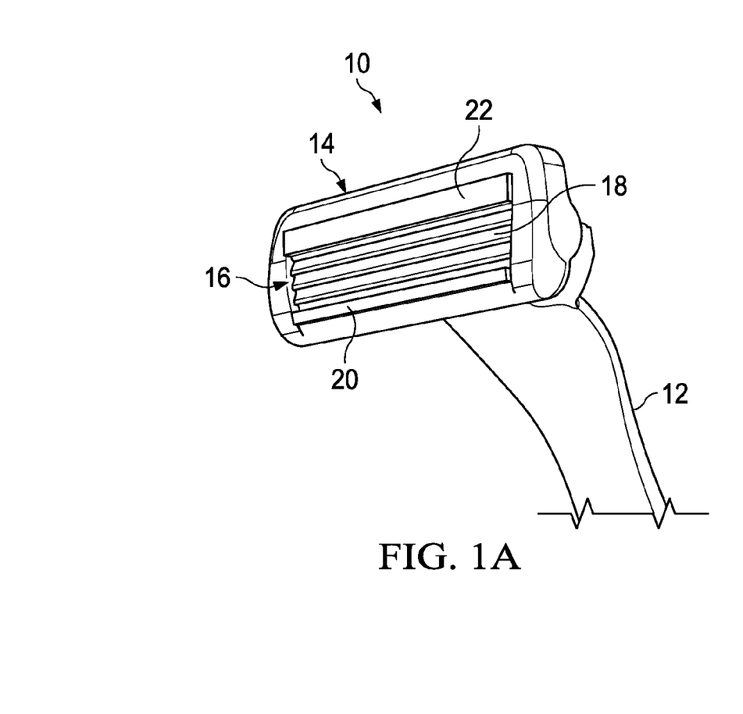
FIG. 1A is a perspective front view of a first shaving razor.
Figure 1B:
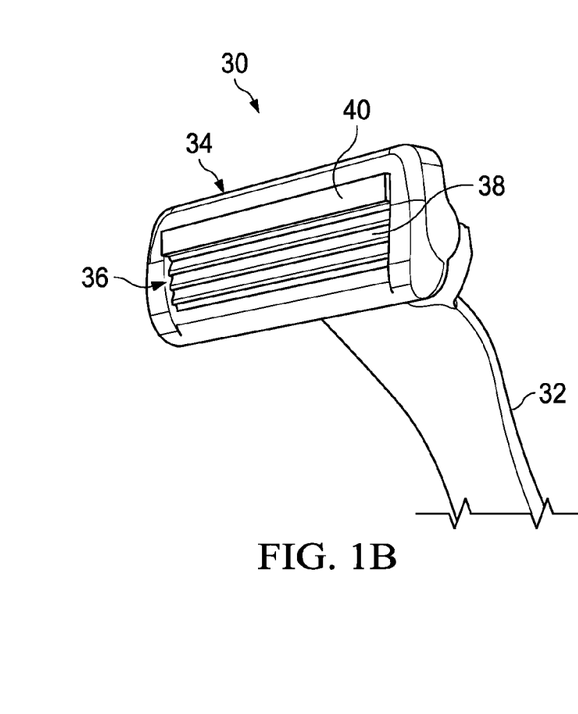
FIG. 1B is a perspective front view of a second shaving razor.

Referring to FIGS. 1A and 1B, perspective views of a first shaving razor 10 and a second shaving razor 30 are shown, respectively. The first shaving razor 10 may include a handle 12 having a blade cartridge unit 14. The blade cartridge unit 14 may be mounted to an end of the handle 12. The blade cartridge unit 14 may have a shaving surface 16 with at least one blade 18 for shaving hair and a first lubricating component 20 positioned in front of the at least one blade 18 for delivering a liquid to the skin. For example, the liquid may cover or be deposited onto the at least one blade 18 during a shaving stroke. The shaving surface 16 of the first shaving razor 10 may also have a second component 22 positioned behind the at least one blade 18 for delivering a liquid to the skin. The structure of the first component 20 and the second component 22 may be the same or different. In certain embodiments, the first lubricating component 20 and/or the second lubricating component 22 may be a molded or extruded lubricating bar, a gel reservoir and/or liquid dispensing member. The liquid may provide consumers one or more skin benefits such as moisturization, less irritation during shaving, cooling, heat, anti-acne, or sun protection. The liquid of the first component 20 and the liquid of the second component 22 may be the same or different. It is understood that blade 18 may be any type of cutting member. For example, the blade 18 may include a cutting member of an electric razor or trimmer The second shaving razor 30 may include a handle 32 having a blade cartridge unit 34. The blade cartridge unit 34 may be mounted to an end of the handle 32. The blade cartridge unit 34 may have a shaving surface 36 with at least one blade 38 for shaving hair and a first lubricating component 40 positioned in behind the at least one blade 38 for delivering a substance (e.g., liquid) to the skin. The structure of the first component 20 of the first shaving razor 10 and the first component 40 of the second shaving razor 30 may be the same or different. In certain embodiments, the first lubricating component 40 may be a molded or extruded lubricating bar, a gel reservoir and/or liquid dispensing member. The substance delivered by the first component 20 of the first shaving razor 10 and the substance delivered by the first lubricating component 40 of the second shaving razor 30 may be the same or different.

Figure 2A:
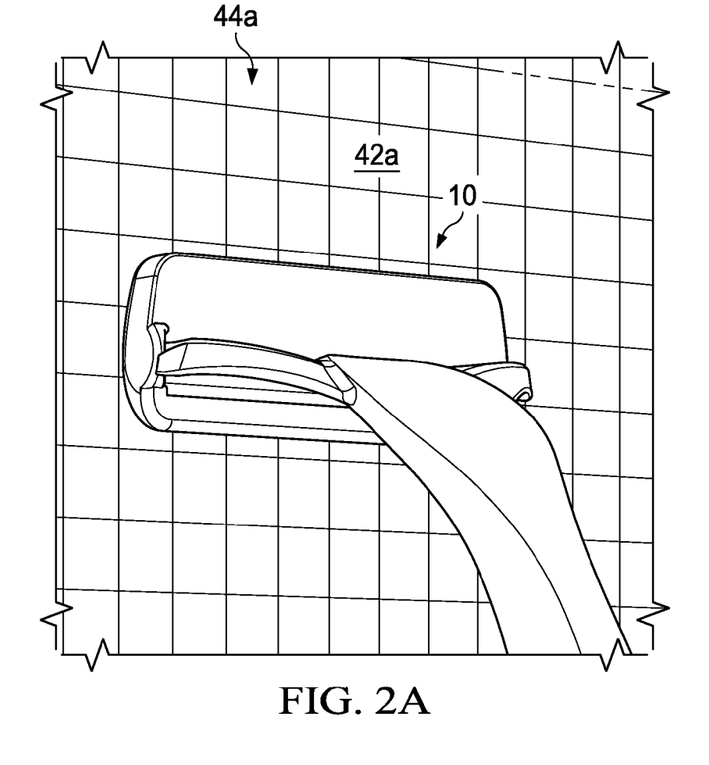
FIG. 2A is a perspective rear view of the first shaving razor.
Figure 2B:
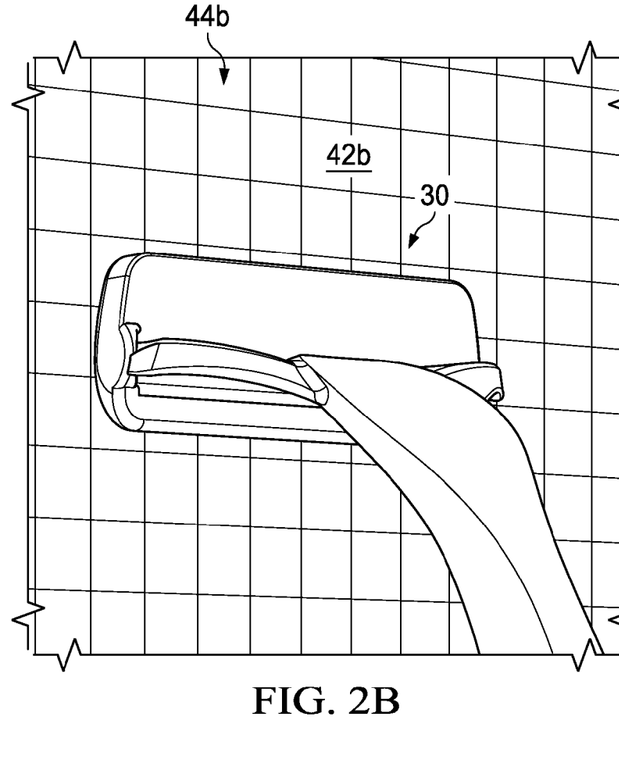
FIG. 2B is a perspective rear view of the second shaving razor.

Referring to FIGS. 2A and 2B, perspective rear views of the first shaving razor 10 and the second shaving razor 30 are shown. The first shaving razor 10 may contact a transparent first surface 42a and the second shaving razor 30 may contact a transparent first surface 42b. It is understood that the transparent shaving surfaces 42a and 42b may be illustrated as separate surfaces or the same surface depending on the particular demonstration method. For example, the transparent shaving surfaces 42a and 42b may be the same surface for a side by side comparison of the first shaving razor 10 and the second shaving razor 30. The transparent first surfaces 42a, 42b represent a surface of the skin to be shaved (i.e., a demonstration surface). The transparent first surfaces 42a, 42b may comprise glass, plastic or any other transparent material. The transparent first surfaces 42a, 42b may also be tinted. In certain embodiments, the transparent first surfaces 42a, 42b may comprise a grid 44a, 44b. The grid 44a, 44b may allow a consumer to better follow movements of the first and second shaving razors 10 and 30 against the transparent first surface 42. The grid 44a, 44b is illustrated as squares, but any geometry may be used for the grid to illustrate a surface and the relative position in space of the first and second shaving razors 10 and 30. It is also understood that all or a portion of the demonstration method may be digitally created or animated. For example, the grid 44a, 44b may be part of a plane of glass or may be digitally created. The transparent first surfaces 42a, 42b may optionally include hairs to mimic the surface of skin. The hairs may be physically attached to the transparent first surface 42a, 42b or digitally added to the transparent first surface 42a, 42b.

Typical shaving demonstrations are not able to illustrate shaving surfaces of razors during a shaving stroke because skin (natural or artificial) is not transparent. The consumer is able to see a before image (e.g., hair on the skin) and after image (hair removed from skin), but not an image during a shaving stroke. For example, such shaving demonstrations may illustrate a man shaving, but the shaving surface of the razor is pressed against the skin, thus hiding the blades and other components. As shown in FIGS. 2A and 2B, the shaving surfaces 16 and 36 are hidden from view. Accordingly, previous demonstration methods could only demonstrate components (such as lubrication bars or gel reservoirs) that release substances onto the skin behind one of the blades, but not in front of the blades. Accordingly, the consumer may not have a clear understanding of the various components of the shaving razor, how they work, or the benefits they provide.

Figure 3A:
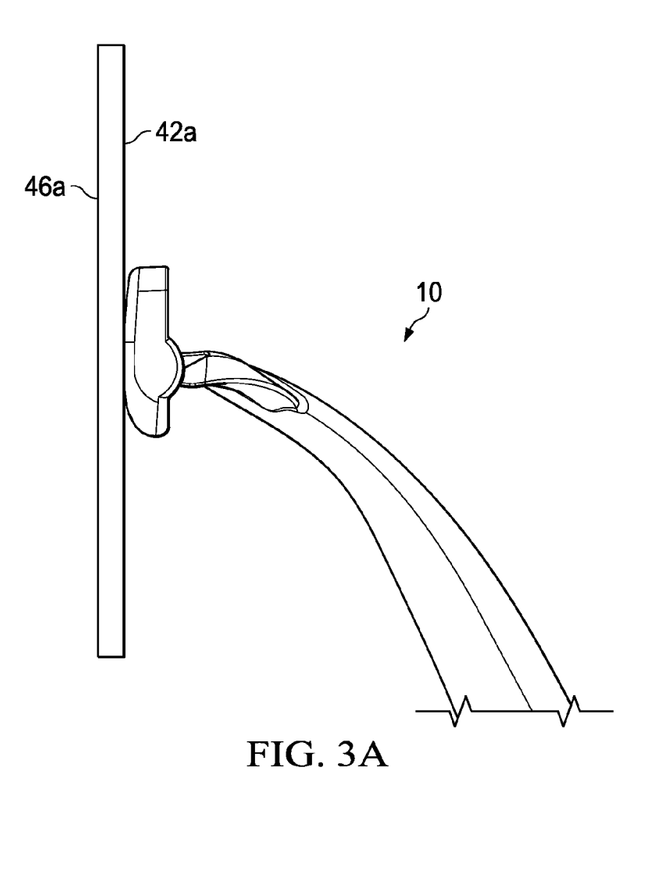
FIG. 3A is a perspective side view of the first shaving razor.
Figure 3B:
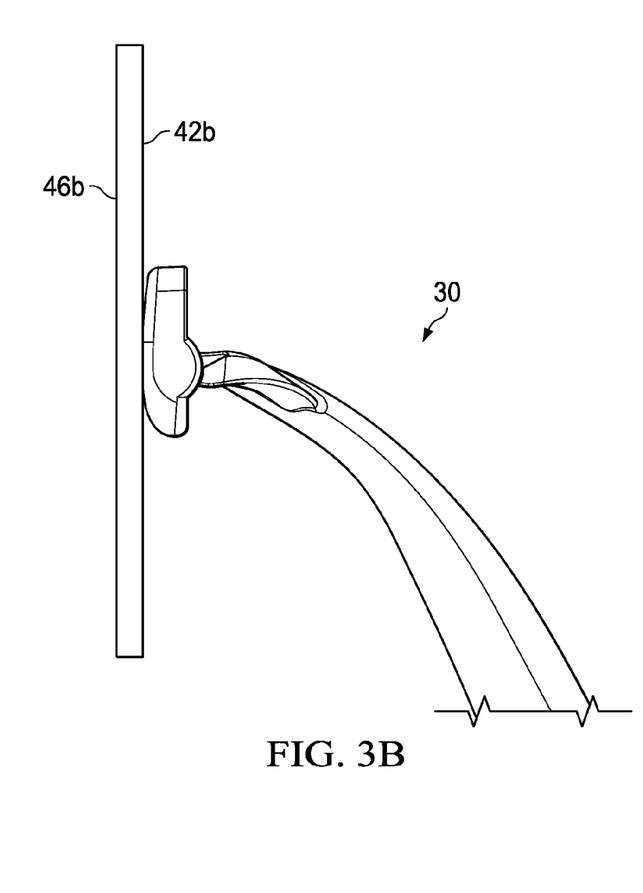
FIG. 3B is a perspective side view of the second shaving razor.
Figure 4A:
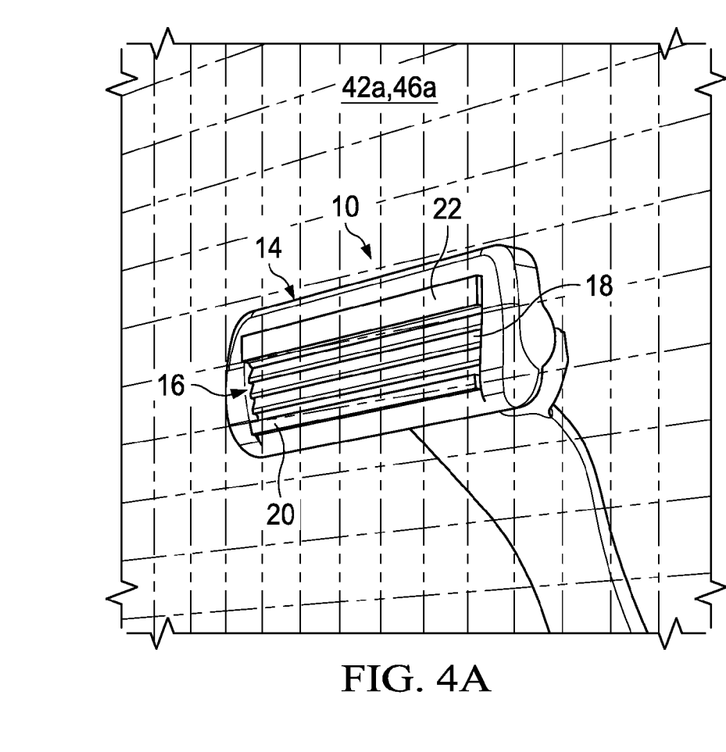
FIG. 4A is a perspective front-side view of the first shaving razor.
Figure 4B:
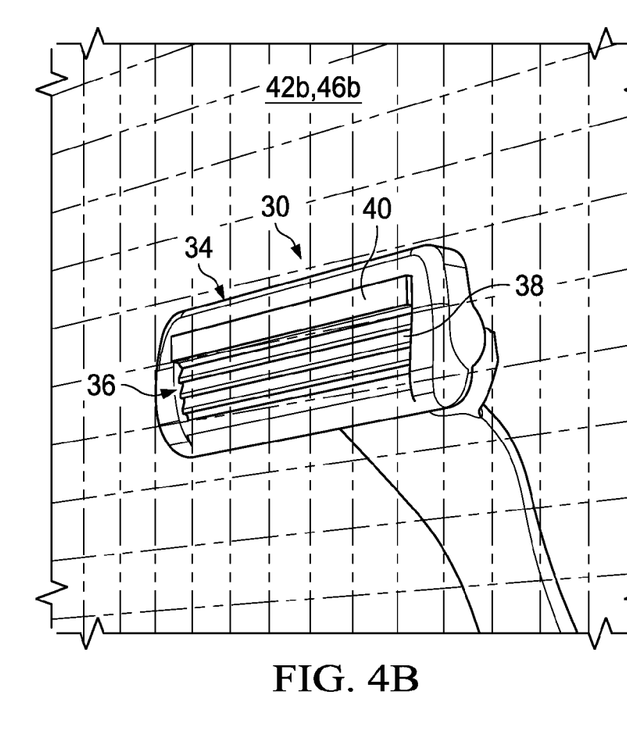
FIG. 4B is a perspective front-side view of the second shaving razor.

Referring to FIGS. 3A and 3B perspective side views of the first shaving razor 10 and the second shaving razor 30 are illustrated against the transparent first surfaces 42a,42b, respectively. The first shaving razor 10 and the second shaving razor 30 are illustrated rotating along with the transparent first surface 42a,42b to guide the consumer from the rear view of first shaving razor 10 and the second shaving razor 30 shown in FIGS. 2A and 2B towards a left side view of the first shaving razor 10 and the second shaving razor 30 in FIGS. 3A and 3B. As shown in FIGS. 3A and 3B, the shaving surface 16 and 36 are still hidden from view. The first shaving razor 10 and the second shaving razor 30 may continue to rotate along with the respective transparent first surface 42a,42b, as shown in FIG. 4A and 4B. FIGS. 4A and 4B are perspective front-side views of the first shaving razor 10 and the second shaving razor 30 against the respective transparent first surface 42a,42b. In FIGS. 4A and 4B the shaving surface 16 of the first shaving razor 10 and the shaving surface 36 of the second shaving razor 30 are visible from viewing through a second transparent surface 46a,46b that is opposite the respective transparent first surface 42a,42b (e.g., 180 degrees). The transparent first surface 42a,42b and the transparent second surface 46a,46b allow the shaving surface 16 of the first shaving razor 10 and the shaving surface 36 of the second shaving razor 30 to be seen by a consumer. For example, in FIGS. 4A and 4B, the at least one blade 18 of the first shaving razor 10 and the at least one blade 38 of the second shaving razor 30 become visible. The first and second components 20 and 22 of the first shaving razor 10 and the first component 40 of the second shaving razor 30 also become visible in FIGS. 4A and 4B. The rotation may continue until the entire shaving surface of the first shaving razor and the entire shaving surface of the second shaving razor become visible, as illustrated in FIGS. 5A and 5B.

Figure 5A:
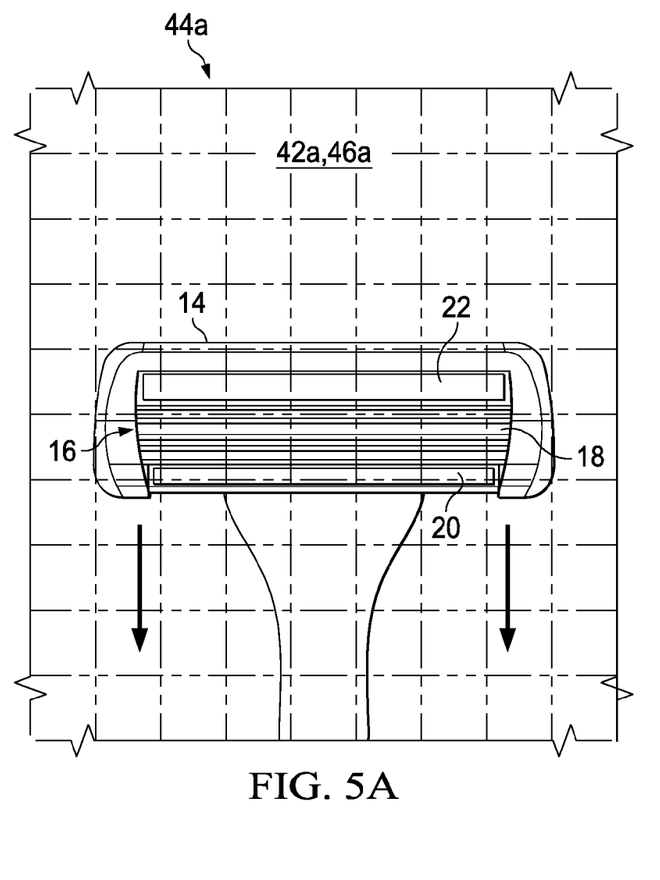
FIG. 5A is a front view of the first shaving razor in a first position.
Figure 5B:
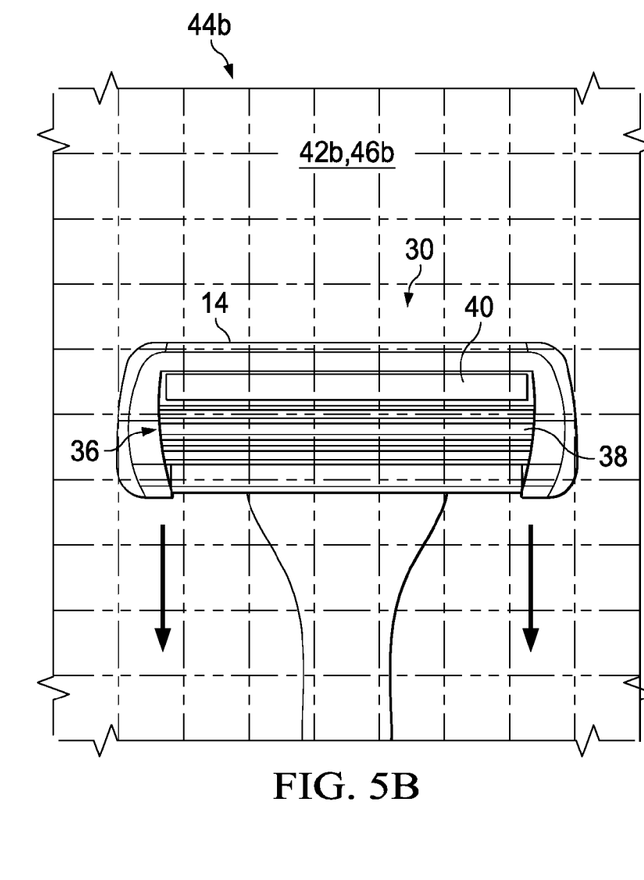
FIG. 5B is a front view of the second shaving razor in a first position.

FIGS. 5A and 5B illustrate the first shaving razor 10 and the second shaving razor 30 (respectively) continuing to rotate along with the transparent first surface 42a,42b until a front view of the first shaving razor 10 and the second shaving razor 30 against the transparent first surface 40 are shown through the respective transparent second surface 46a,46b. In certain embodiments, the first shaving razor 10 and the second shaving razor 30 along with the respective transparent first surface 42a,42b may be illustrated as rotating a total of about 20 degrees to about 200 degrees. For example, FIGS. 2A and 2B may illustrate the first and second shaving razors 10 and 30 rotated to an initial 15-40 degree rotated view, FIGS. 3A and 3B may be rotated an additional 40-70 degrees, FIGS. 4A and 4B may be rotated an additional 20-40 degrees, and FIGS. 5A and 5B may be rotated an additional 50-70 degrees.

Figure 6A:
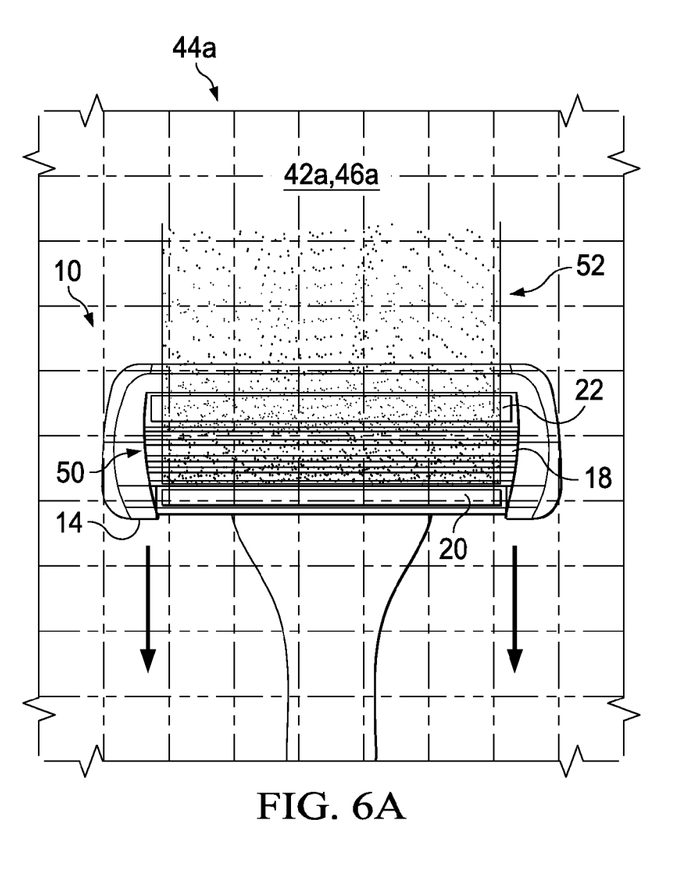
FIG. 6A is a front view of the first shaving razor in a second position.
Figure 6B:
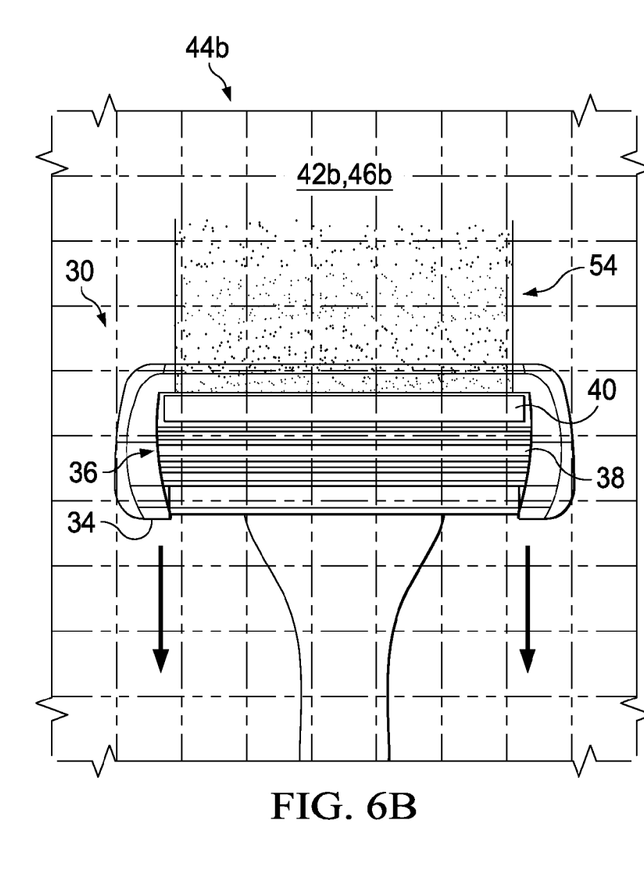
FIG. 6B is a front view of the second shaving razor in a second position.

In FIGS. 5A and 5B the first shaving razor 10 and the second shaving razor 30 are shown in a first position against the transparent first surface 42a,42b. The grid 44a,44b may facilitate illustrating the position of the first and second shaving razors 10, 30 against the respective transparent first surface 42a,42b. As shown in FIGS. 6A and 6B, the first shaving razor and/or the second shaving razor 10, 30 may move relative to the transparent first surface 42a,42b to illustrate a consumer benefit, such as lubrication or moisturization. As the first shaving razor 10 move relative to the transparent first surface 42a (e.g., slide down in the direction of the arrows of FIG. 5A), the first component 20 of the first shaving razor 10 may release a first substance 50 against the transparent first surface 42a and the second component 22 of the first shaving razor 10 may release a second 52 substance against the transparent first surface 42a. Similarly, the first component 40 of the second shaving razor 30 may release a substance 54 against the transparent first surface 42b. Accordingly, the first component 20 of the first shaving razor 10, the second component 22 of the first shaving razor 10 and the first component 40 of the second shaving razor 30 are illustrated as releasing respective substances 50, 52 and 54 against the respective transparent first surface 42a,42b as viewed through the second transparent surface 46a,46b (respectively). In certain embodiments, the first substance 50 released by the first component 20 of the first shaving razor 10 may be deposited (e.g., cover) the at least one blade 18. The deposit of the first substance 50 such as a lubricant or moisturizer (e.g., an oil or Polyox) onto the at least one blade 18 may help reduce shaving irritation caused by nicks and cuts or provide other benefits. The substances 50, 52 and 54 may be the same or different and may have similar or different benefits. In certain embodiments, the substances 50 and 52 (and/or the components 20 and 22) may be represented by the same color or different colors. For example the substance 50 may be yellow and the substance 52 may be blue. Accordingly, the color behind the second component 22 may be green (e.g., the resulting combinations of the color of the substances 50 and 52).

It is understood that the first component 20 and/or the second component 22 of the first shaving razor 10, as well as any substances released may be generated digitally (e.g., using animation). A non-limiting example may include a shaving demonstration method with a substance released by the first and second components 20 and 22 of the first shaving razor 10 are images of a liquid or a path of liquid. Digital animation may allow special effects to be added such adding additional light or sparkles to any substances released. In certain embodiments, the first shaving razor 10 and the second shaving razor 30 may be black and white, but the first component 20 and the second component 22 of the first shaving razor 10 and the first component of the second shaving razor may be colored to further emphasize a benefit to consumers. For example, the first component, the second component may be shown in the color blue. The at least one blade may also be shown as blue to illustrate the substance deposited on the at least one blade 18.

Figure 7:
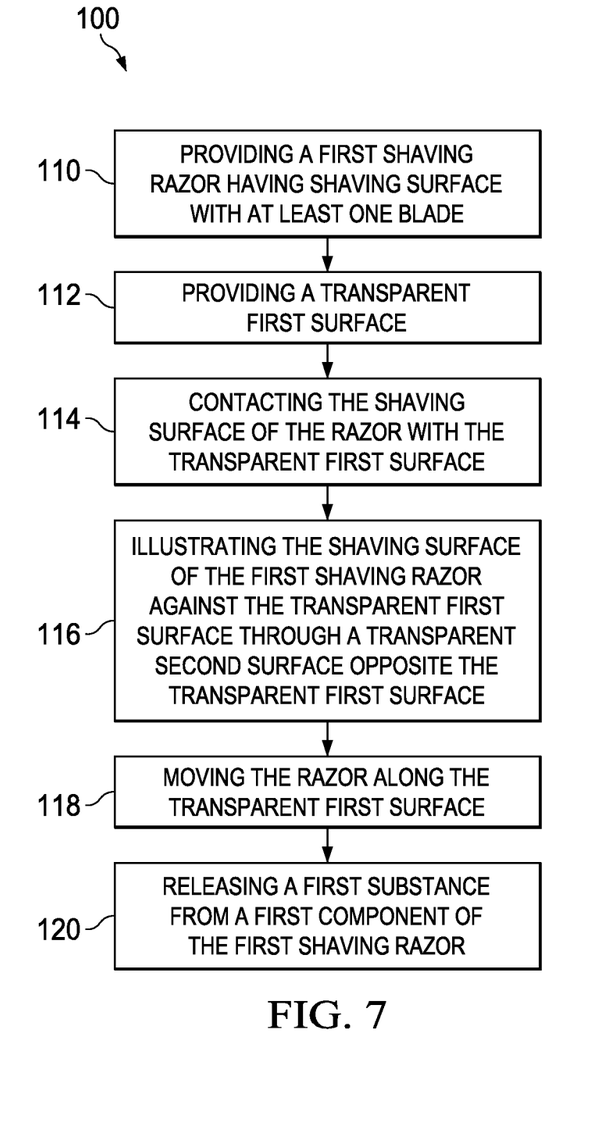
FIG. 7 is a schematic representation of an example of a method for demonstrating shaving razor performance to a consumer.

Referring to FIG. 7, a schematic representation of a possible example of a shaving demonstration method 100 is illustrated. The shaving demonstration method may comprise a first step 110 of providing a first shaving razor having a shaving surface with at least one blade, such as the first shaving razor 10 with shaving surface 16, as previously described. In a second step 112, a transparent first surface may be provided, such as the transparent first surface 42a previously described. A third step 114 may include contacting the shaving surface of the first shaving razor 10 with the transparent first surface. In a fourth step 116 the shaving surface of the first shaving razor against the transparent first surface may be illustrated through a transparent second surface that is opposite the first surface (e.g., looking at the shaving surface through a plane of glass). The first shaving razor may be moved along the transparent surface (step 118) to illustrate the release of a first substance from a first component of the first shaving razor through the transparent surfaces 42a and 46a (step 120).

Figure 8:
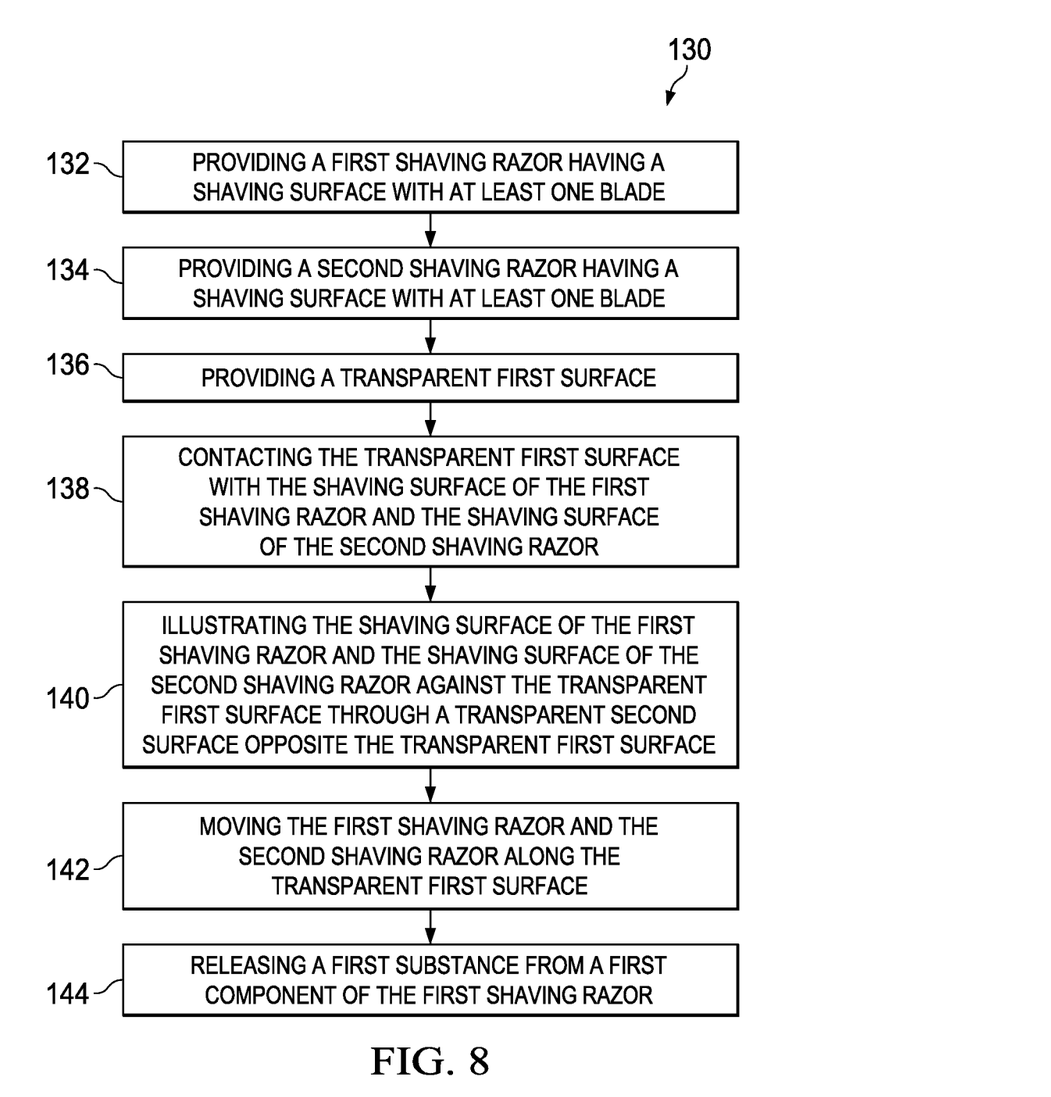
FIG. 8 is a schematic representation of another possible example of a method for demonstrating shaving razor performance to a consumer.

The shaving demonstration method 100 illustrates shaving performance for a single shaving razor. However, it may be more desirable to provide a shaving demonstration method that compares two different razors. Referring to FIG. 8, a schematic representation of a second shaving demonstration method 130 is illustrated. The second shaving demonstration method 130 may comprise a first step 132 of providing a first shaving razor having a shaving surface with at least one blade, such as the first shaving razor 10 as previously described. A second shaving razor having a shaving surface with at least one blade (such as the first shaving razor 30 as previously described) may be provided in step 134. In step 136, a transparent first surface may be provided, such as the transparent first surface 42a,42b as previously described. Step 138 may include contacting the transparent first surface with the shaving surface of the first shaving razor 10 and the shaving surface of the second shaving razor 30. In step 140 the shaving surface of the first shaving razor and the shaving surface of the second shaving razor 30 may be illustrated against the transparent first surface through a transparent second surface that is opposite the first surface (e.g., looking at the shaving surfaces through a plane of glass). The first shaving razor and the second shaving razors may be moved along the transparent surface (step 142) to illustrate the release of a first substance from a first component of the first shaving razor through the transparent surfaces 42a,42b and 46a, 46b (step 144). In certain embodiments, the second shaving razor may not release any substance or may release a substance from a different component or a component in a different position than the first shaving razor.

It is understood that the various steps of the shaving demonstration method 100 and the second shaving demonstration method 130 may include live demonstrations, video filming, animations, illustrations, computer simulated models, or any combination thereof. It is also understood that any of the steps may be performed in any order.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving demonstration method comprising:
providing a first shaving razor having a shaving surface with at least one blade having a cutting edge;
providing a transparent first surface;
contacting the shaving surface of the first shaving razor with the transparent first surface;
illustrating the shaving surface of the first shaving razor against the transparent first surface through a transparent second surface opposite the first surface;
moving the first shaving razor along the transparent first surface illustrating a consumer benefit.

2. The shaving demonstration method of claim 1 wherein at least one of the first and second surfaces is tinted.

3. The shaving demonstration method of claim 1 wherein at least one of the first and second surfaces comprises a grid.

4. The shaving demonstration method of claim 1 wherein the consumer benefit is lubrication.

5. The shaving demonstration method of claim 1 wherein at least one of the first and second surfaces comprises glass or plastic.

6. The shaving demonstration method of claim 1 wherein at least one of the first and second surfaces comprises hair.

7. The shaving demonstration method of claim 1 wherein the first shaving razor and the first surface are rotated together until the shaving surface of the first shaving razor and the image of the transparent second surface are both visible.

8. The shaving demonstration method of claim 1 further comprising releasing a first substance from a first component of the first shaving razor in front of the at least one blade and onto the transparent first surface.

9. The shaving demonstration method of claim 8 wherein the first substance is an image of a liquid.

10. The shaving demonstration method of claim 8 wherein the first substance is a liquid.

11. The shaving demonstration method of claim 8 further comprising releasing a second substance from a second component of the first shaving razor behind the at least one blade onto the transparent second surface.

12. The shaving demonstration method of claim 11 the second substance is a liquid.

13. The shaving demonstration method of claim 11 the second substance is an image of a liquid.

14. The shaving demonstration method of claim 8 wherein the first substance covers the at least one blade.

15. A shaving demonstration method comprising:
providing a first shaving razor having a shaving surface with at least one blade;
providing a second shaving razor having a shaving surface with at least one blade;
providing a transparent first surface;
contacting the first surface with the shaving surface of the first shaving razor and the shaving surface of the second shaving razor;
illustrating the shaving surface of the first shaving razor and the shaving surface of the second shaving razor against the first surface through a transparent second surface opposite the first surface;
moving the first shaving razor and the second shaving razor along the first surface.

16. The shaving demonstration method of claim 15 wherein at least one of the first and second surfaces comprises a grid.

17. The shaving demonstration method of claim 15 wherein a first component of the first shaving razor releases a first substance in front of the at least one blade of the first shaving razor and onto the transparent first surface.

18. The shaving demonstration method of claim 17 wherein a second component of the first shaving razor releases a second substance onto the transparent first surface.

19. The shaving demonstration method of claim 17 wherein the first substance covers the at least one blade.

20. The shaving demonstration method of claim 19 wherein a first component of the second shaving razor releases a first substance behind the at least one blade of the second shaving razor onto the transparent first surface.

* * * * *